United States Patent
Sellnau

(10) Patent No.: US 11,078,867 B2
(45) Date of Patent: Aug. 3, 2021

(54) PISTON AND BOWL FOR GASOLINE DIRECT INJECTION COMPRESSION IGNITION (GDCI)

(71) Applicant: DELPHI TECHNOLOGIES IP LIMITED, St. Michael (BB)

(72) Inventor: Mark C. Sellnau, Bloomfield Hills, MI (US)

(73) Assignee: DELPHI TECHNOLOGIES IP LIMITED

( * ) Notice: Subject to any disclaimer, the term of this patent is extended or adjusted under 35 U.S.C. 154(b) by 1016 days.

(21) Appl. No.: 14/784,680

(22) PCT Filed: Apr. 16, 2014

(86) PCT No.: PCT/US2014/034363
§ 371 (c)(1),
(2) Date: Oct. 15, 2015

(87) PCT Pub. No.: WO2014/172457
PCT Pub. Date: Oct. 23, 2014

(65) Prior Publication Data
US 2016/0053714 A1 Feb. 25, 2016

Related U.S. Application Data

(60) Provisional application No. 61/812,367, filed on Apr. 16, 2013.

(51) Int. Cl.
*F02B 1/12* (2006.01)
*F02F 3/28* (2006.01)
(Continued)

(52) U.S. Cl.
CPC ............ *F02F 3/28* (2013.01); *F02B 1/12* (2013.01); *F02B 3/06* (2013.01); *F02B 17/005* (2013.01);
(Continued)

(58) Field of Classification Search
CPC .......... F02B 1/12; F02B 17/005; F02B 23/06; F02B 23/0696; F02B 3/06; F02B 3/10; F02B 3/12; F02D 2041/3052
(Continued)

(56) References Cited

U.S. PATENT DOCUMENTS

| 3,963,001 A * | 6/1976 | Kruckenberg | ........... F02B 19/04 |
| | | | 123/259 |
| 4,324,214 A * | 4/1982 | Garcea | ..................... F02B 23/08 |
| | | | 123/193.6 |

(Continued)

FOREIGN PATENT DOCUMENTS

| CN | 1226630 A | 8/1999 |
| CN | 1233313 A | 10/1999 |

(Continued)

OTHER PUBLICATIONS

Mark Sellnau, et al.: "Gasoline Direct Injection Compression Ignition (GDCI)-Diese;=;oel Efficienty with Low C)2 Emissions", SAE International, vol. 4, Issue 1, Apr. 12, 2011, pp. 2010-2022.

*Primary Examiner* — Lindsay M Low
*Assistant Examiner* — Omar Morales
(74) *Attorney, Agent, or Firm* — Joshua M. Haines

(57) ABSTRACT

A piston for use in a GDCI engine cooperates with the wall of a cylinder defined in the engine and with a cylinder head to define a combustion chamber. The surface of the piston that faces the cylinder head defines a bowl that is configured to receive fuel that is dispensed from a fuel injector that is located in the cylinder head substantially along the central axis of the cylinder. The bowl is configured such that substantially all of the injected fuel associated with a combustion event reaches a localized equivalence ratio greater than 0.0 and less than or equal to 1.2 at a time immediately preceding initiation of the combustion event.

10 Claims, 3 Drawing Sheets

(51) Int. Cl.
*F02B 17/00* (2006.01)
*F02B 3/06* (2006.01)
*F02B 23/06* (2006.01)
*F02B 23/10* (2006.01)
*F02D 41/30* (2006.01)

(52) U.S. Cl.
CPC .......... *F02B 23/06* (2013.01); *F02B 23/0696* (2013.01); *F02B 2023/102* (2013.01); *F02D 2041/3052* (2013.01); *Y02T 10/12* (2013.01)

(58) Field of Classification Search
USPC ...................................................... 123/193.4
See application file for complete search history.

(56) References Cited

U.S. PATENT DOCUMENTS

| | | | | |
|---|---|---|---|---|
| 6,230,683 | B1* | 5/2001 | zur Loye | F02B 1/12 123/27 GE |
| 6,286,482 | B1 | 9/2001 | Flynn et al. | |
| 2002/0007816 | A1* | 1/2002 | Zur Loye | F02B 1/04 123/295 |
| 2005/0235950 | A1 | 10/2005 | Weber et al. | |
| 2007/0261666 | A1* | 11/2007 | Bertsch | F02B 17/005 123/298 |
| 2008/0275621 | A1 | 11/2008 | Kobayashi | |
| 2010/0307443 | A1* | 12/2010 | Sand | F02F 1/18 123/193.2 |
| 2011/0023854 | A1* | 2/2011 | Heilenbach | F02F 3/26 123/661 |
| 2011/0192367 | A1* | 8/2011 | Reitz | F02D 41/0025 123/1 A |
| 2011/0320104 | A1* | 12/2011 | Sellnau | F02D 35/023 701/103 |
| 2012/0222639 | A1 | 9/2012 | Knauf et al. | |

FOREIGN PATENT DOCUMENTS

| | | |
|---|---|---|
| CN | 102498279 A | 6/2012 |
| WO | 2012058280 A2 | 5/2012 |

* cited by examiner

PISTON AND BOWL FOR GASOLINE DIRECT INJECTION COMPRESSION IGNITION (GDCI)

CROSS-REFERENCES TO RELATED APPLICATIONS

This application is a national stage application under 35 U.S.C. 371 of PCT Application No. PCT/US2014/034363 having an international filing date of 16 Apr. 2014, which designated the United States, which PCT application claimed the benefit of U.S. Provisional Application No. 61/812,367 filed Apr. 16, 2013, the entire disclosure of each of which are hereby incorporated by reference.

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

A system for operating an internal combustion engine is described in U.S. Patent Application Publication No. 2013/0213349 A1 published Aug. 22, 2013, the entire disclosure of which is hereby incorporated by reference. This engine operating system, which is known as Gasoline Direct Injection Compression Ignition (GDCI) has demonstrated very high thermal efficiency and very low NOx and particulate matter (PM) emissions. In the ideal GDCI process, fuel is injected late on the engine compression stroke creating a stratified mixture with varying propensity for autoignition. Ideally, burn duration is long enough to keep combustion noise low but fast enough to achieve high expansion ratio for all of the fuel burned. The design of engine components can influence how closely actual engine performance can approach the ideal characteristics.

BRIEF SUMMARY OF THE INVENTION

A piston for use in a GDCI engine cooperates with the wall of a cylinder defined in the engine and with a cylinder head to define a combustion chamber. The surface of the piston that faces the cylinder head defines a bowl that is configured to receive fuel that is dispensed from a fuel injector that is located in the cylinder head substantially along the central axis of the cylinder. The bowl is configured such that substantially all of the injected fuel associated with a combustion event reaches a localized equivalence ratio greater than 0.0 and less than or equal to 1.2 at a time immediately preceding initiation of the combustion event.

DETAILED DESCRIPTION OF THE INVENTION

Figure 1:
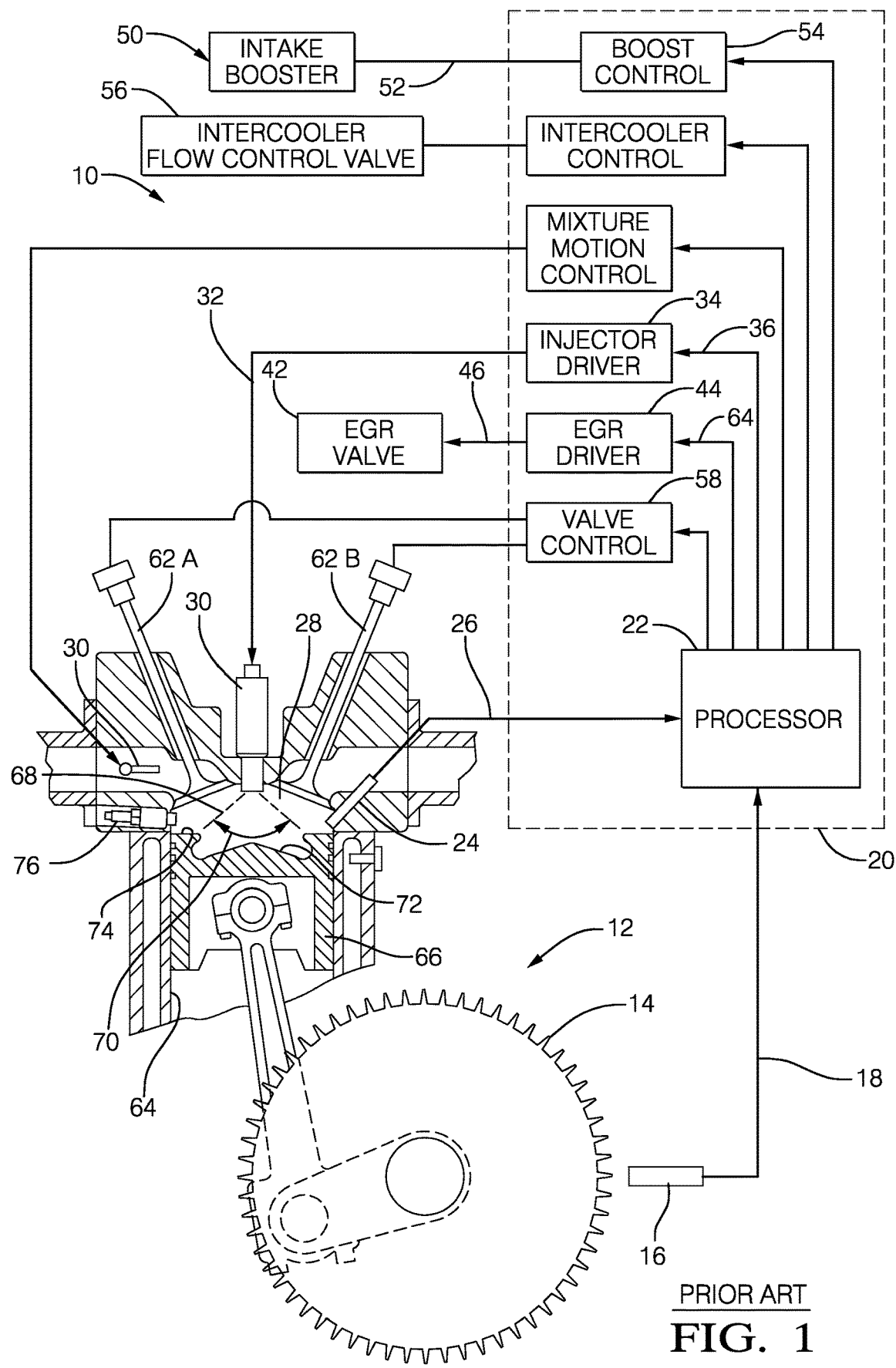
FIG. 1 is a block diagram of an engine control system in accordance with an embodiment of a GDCI engine.

By way of introduction, a block diagram of a GDCI engine control system 10 for controlling an internal combustion engine 12, as previously described in commonly owned U.S. Patent Application Publication No. 2013/0213349 A1 published Aug. 22, 2013, is presented as FIG. 1. The engine 12 is illustrated as having a single cylinder bore 64 containing a piston 66, wherein the region above the piston 66 defines a combustion chamber 28; however it will be appreciated that the system 10 may be adapted to engines having multiple cylinders and combustion chambers. The engine control system 10 may control an engine having multiple combustion chambers by individually controlling each of the multiple combustion chambers, or may control such an engine based on a signal from a sensor that is representative of a typical or average condition in each combustion chamber. The system 10 may include a toothed crank wheel 14 and a crank sensor 16 positioned proximate to the crank wheel 14 such that the crank sensor 16 is able to sense rotational movement of the crank wheel teeth and output a crank signal 18 indicative of a crank angle and a crank speed.

The engine control system 10 may also include a controller 20, such as an engine control module (ECM), configured to determine a crank angle and a crank speed based on the crank signal 18. The controller 20 may include a processor 22 or other control circuitry as should be evident to those in the art. The controller 20 or processor 22 may include memory, including non-volatile memory, such as electrically erasable programmable read-only memory (EEPROM) for storing one or more routines, thresholds and captured data. The one or more routines may be executed by the processor 22 to perform steps for determining a prior engine control parameter and scheduling a future engine control signal such that a future engine control parameter corresponds to a desired engine control parameter. FIG. 1 illustrates the processor 22 and other functional blocks as being part of the controller 20. However, it will be appreciated that it is not required that the processor 22 and other functional blocks be assembled within a single housing, and that they may be distributed about the engine 12.

Continuing to refer to FIG. 1, the engine control system 10 may include a combustion phase detection means 24 configured to output a combustion phase signal 26 indicative of a combustion phase characteristic of a combustion event occurring within the combustion chamber 28. One way to monitor the progress of a combustion event is to determine a heat release rate or cumulative heat release for the combustion event, as will be discussed below in relation to FIG. 4. However, because of the number and complexity of measurements, determining heat release may not be suitable for controlling engines during field use such as when engines are operated in vehicles traveling in uncontrolled environments like public roadways. A combustion phase detection means suitable for field use may provide an indication of a combustion phase characteristic that can be correlated to laboratory type measurements such as heat release. Exemplary combustion phase detection means 24 include, but are not limited to, an ionization sensor configured to sense the ionization level of the combustion products in the combustion chamber 28, or a pressure sensor configured to sense the pressure within the combustion chamber 28. Another device that may be useful for indicating some aspect of the combustion process is a combustion knock sensor. The combustion phase detection means 24 may be any one of the exemplary sensors, or a combination of two or more sensors arranged to provide an indication of a combustion phase characteristic. The combustion phase detection means 24 may be incorporated into another device, such as incorporating an ionization sensor or a pressure sensor into a spark plug or a glow plug.

The engine control system 10 includes one or more engine control devices operable to control an engine control parameter in response to an engine control signal, wherein the engine control parameter influences when autoignition occurs. One example of an engine control device is a fuel injector 30 adapted to dispense fuel 68 in accordance with an injector control signal 32 output by an injector driver 34 in response to an injection signal 36 output by the processor 22. The fuel injection profile may include a plurality of injection events. Controllable aspects of the fuel injection profile may include how quickly or slowly the fuel injector 30 is turned on and/or turned off, a fuel rate of fuel 68 dispensed by the fuel injector 30 while the fuel injector 30 is on, or the number of fuel injections dispensed to achieve a combustion event. Varying one or more of these aspects of the fuel injections profile may be effective to control autoignition.

The exemplary engine control system 10 includes an exhaust gas recirculation (EGR) valve 42. While not explicitly shown, it is understood by those familiar with the art of engine control that the EGR valve regulates a rate or amount of engine exhaust gas that is mixed with fresh air being supplied to the engine to dilute the percentage of oxygen and/or nitrogen in the air mixture received into the combustion chamber 28. The controller 20 may include an EGR driver 44 that outputs an EGR control signal 46 to control the position of the EGR valve 42. The EGR driver may, for example, pulse width modulate a voltage to generate an EGR control signal 46 effective to control the EGR valve to regulate the flow rate of exhaust gases received by the engine 12.

Referring again to FIG. 1, the engine control system 10 may include other engine control devices. For example the engine control system 10 may include an intake booster device 50 such as a turbocharger or a supercharger. The intake booster device 50 receives a booster control signal 52 from a boost control block 54 that may control a boost pressure by controlling the position of a waste gate or bypass valve, or controlling a vane position in a variable geometry turbocharger. The engine control system 10 may also include an intercooler flow control valve 56 that regulates the flow of engine coolant through the intercooler for warming the engine intake air when the ambient air temperature is low, thereby controlling the temperature of air received by the engine 12. The engine control system 10 may also include a valve control block 58 that may directly control the actuation of engine intake valve 62A and exhaust valve 62B, or may control the phase of a cam (not shown) actuating the intake valve 62A and/or the exhaust valve 62B.

In order to achieve autoignition of the air-fuel mixture over essentially the entire load-speed range of the engine while achieving acceptable fuel consumption, noise, and emissions results, it has been found advantageous to utilize a late-injection, stratified-mixture, low-temperature combustion process. The method of fuel injection is very important for the success of this process. Fuel 68 is injected by the fuel injector 30 at a pressure in the range of 100 to 500 bar late on the compression stroke using a number of distinct injection events to produce a certain state of controlled air-fuel mixture stratification in the combustion chamber 28. The state of stratification in the combustion chamber 28 controls the time at which autoignition occurs and the rate at which it proceeds. Depending on engine speed and load, single-injection, double-injection, triple-injection, quad-injection, or pent-injection strategies may be used. The quantity and timing of each injection is important and must be optimized for best results. Fuel is injected late on the compression stroke and generally in the range 100 crank angle degrees before top dead center to 10 crank angle degrees after top dead center. If fuel is injected too early, wetting of the cylinder wall 64 and/or the piston 66 may occur and high emissions may result.

Referring again to FIG. 1, the combustion chamber 28 is defined in part by the top surface 74 of the piston 66. The injector is configured to inject fuel 68 over a spray angle 70. The engine 12 may also be equipped with a peripherally located ignition source such as a spark plug 76 to assist with initial engine starting.

Figure 2:
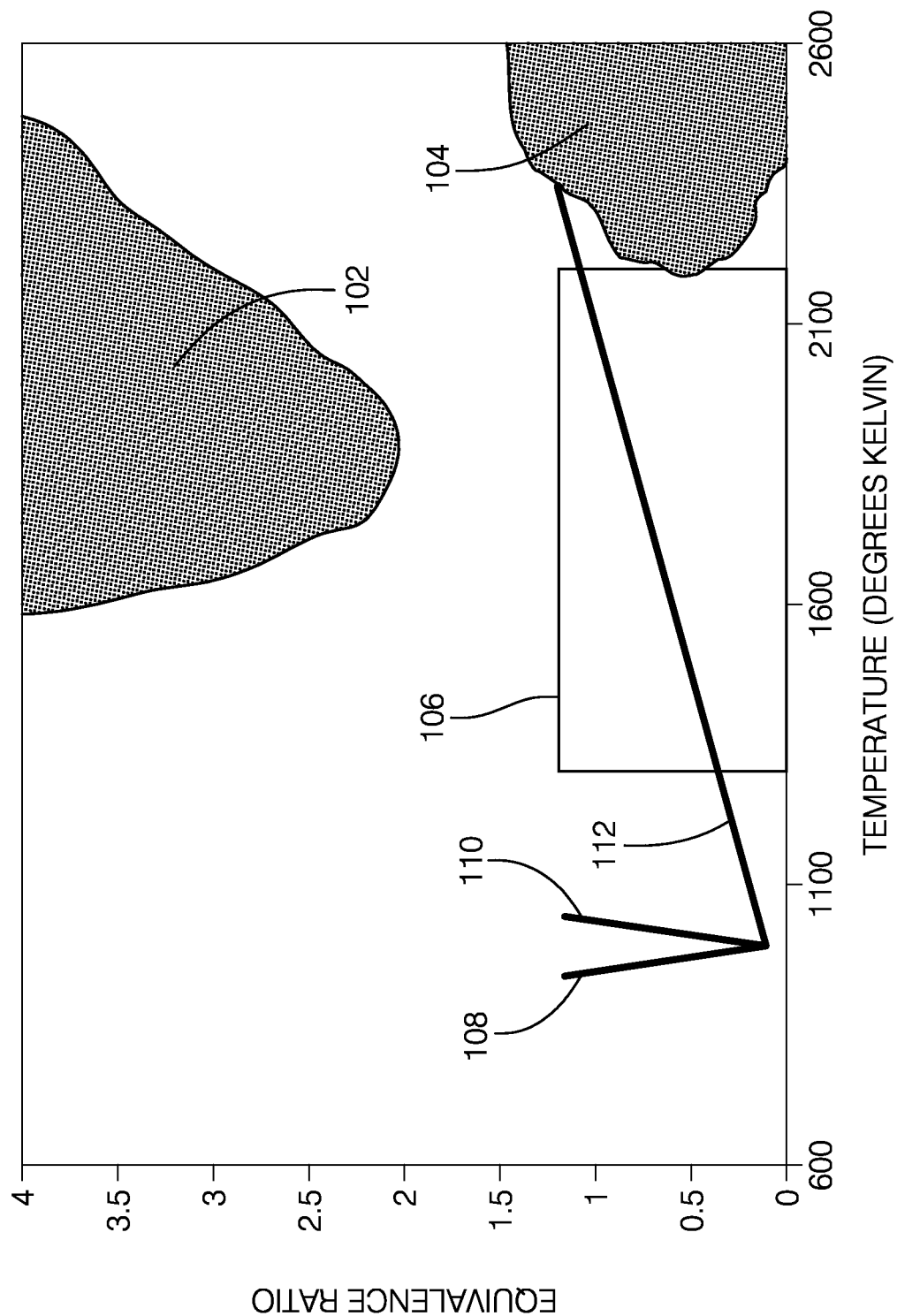
FIG. 2 is a preferred Phi-T diagram for a GDCI engine.

FIG. 2 depicts a preferred Phi-T diagram for a GDCI engine. In FIG. 2, the x-axis represents temperature of the air/fuel charge in degrees Kelvin, and the y-axis represents the localized equivalence ratio for fuel in the air/fuel charge. Equivalence ratio, denoted as Phi, is defined as the localized fuel/air ratio divided by the stoichiometric fuel/air ratio. Accordingly, a stoichiometric mixture of air and fuel would have an equivalence ratio of 1.0, with a rich mixture having a Phi value greater than 1.0 and a lean mixture having a Phi value less than 1.0.

With continued reference to FIG. 2, a first region 102 is identified. The region 102 indicates combustion conditions that contribute to production of particulate matter (soot), with increasing soot production occurring as the combustion conditions move toward the interior of region 102. FIG. 2 also identifies a second region 104 that indicates combustion conditions that contribute to production of NOx, with increasing NOx production occurring as the combustion conditions move toward the interior of region 104.

Still referring to FIG. 2, a third region 106 is identified. The third region 106 is represented by a rectangle approximately bounded by the lines Phi=0, Phi=1.2, T=1300° K., and T=2200° K. The region 106 represents the desired range of combustion conditions to avoid both the first region 102 corresponding to soot production and the second region 104 that corresponds to NOx production, as well as to avoid undesirable levels of carbon monoxide (CO) that can occur with Phi>1.2.

Continuing to refer to FIG. 2, a line 108 depicts a desired Phi-T distribution for fuel injected into the combustion chamber immediately preceding initiation of combustion. As shown by the stratification line 108, at start of combustion, which occurs approximately with the piston at top-dead-center (TDC) it is desirable to have stratification of the air/fuel mixture with all air/fuel parcels in the combustion chamber no richer than a Phi value of approximately 1.2. The stratification line 108 is inclined due to charge cooling effects, with the richest parcels cooling more than the leanest parcels.

FIG. 2 additionally includes a line 110 that represents the desired Phi-T distribution of the parcels in the air/fuel charge near the start of combustion. As combustion occurs, the temperature of each parcel increases, moving the representation of each parcel to the right on the Phi-T diagram.

Line 112 in FIG. 2 represents the desired Phi-T distribution of the parcels in the air/fuel charge near the end of combustion. The temperature increase of each parcel at this point in time is dependent on the equivalence ratio Phi, with the greatest temperature increase corresponding to parcels near stoichiometry (Phi=1). By having most of the combustion occur within the region indicated as 106, emissions of CO, NOx and soot can be minimized.

From the foregoing description of FIG. 2, it will be appreciated that to achieve the desired combustion characteristics requires control of both the temperature and the Phi distribution of the air/fuel charge in the combustion chamber. To achieve the desired distribution of Phi and temperature, as well as to achieve other efficiencies in the GDCI engine 10, several key attributes have been identified. These attributes include maintaining the desired fuel stratification, maintaining the desired air/fuel charge temperature, minimizing heat transfer from the combustion chamber, and maintaining a desired surface temperature profile for the combustion chamber. While many factors contribute to these attributes, several contributing factors are associated with characteristics of the piston 62.

With regard to maintaining the desired fuel distribution, as discussed above it is desirable to have stratification of the air/fuel charge immediately preceding start of combustion, with equivalence ratio values for air/fuel parcels ranging from 0<Phi<1.2. To maintain stratification, it is necessary to minimize flow mixing effects such as squish and swirl that would tend to homogenize the air/fuel mixture at a single value of Phi. A piston head defining a bowl shape that is designed to allow injected fuel to completely vaporize before reaching the surface of the piston head is also desirable, to avoid rich (high Phi) regions associated with liquid fuel.

With regard to maintaining the desired air/fuel charge temperature, in a GDCI engine the air/fuel charge is heated primarily by compression of the air in the cylinder during the compression stroke of the engine. In order to sufficiently heat the air/fuel charge it is desirable to achieve high cylinder pressure, particularly under cold cranking and restart conditions of the engine. This necessitates a piston material of high strength sufficient to withstand high cylinder pressure, as well as low blowby to maintain sufficiently high cylinder pressure.

Additionally, it is desirable in a GDCI engine to limit heat transfer from the combustion chamber. Piston attributes that contribute to minimizing heat transfer include a low surface area, piston material, and a design that minimizes mixture motion effects (e.g. squish, swirl, and tumble) in the combustion chamber.

It is important to maintain a desired surface temperature profile for surfaces that define the combustion chamber. This is to avoid hot spots that can lead to premature combustion of fuel before the desired combustion conditions have been achieved. Because the top surface of the piston defines a portion of the combustion chamber, piston surface features, material, thickness of piston walls, and piston cooling all influence the surface temperature profile for the combustion chamber.

Figure 3:
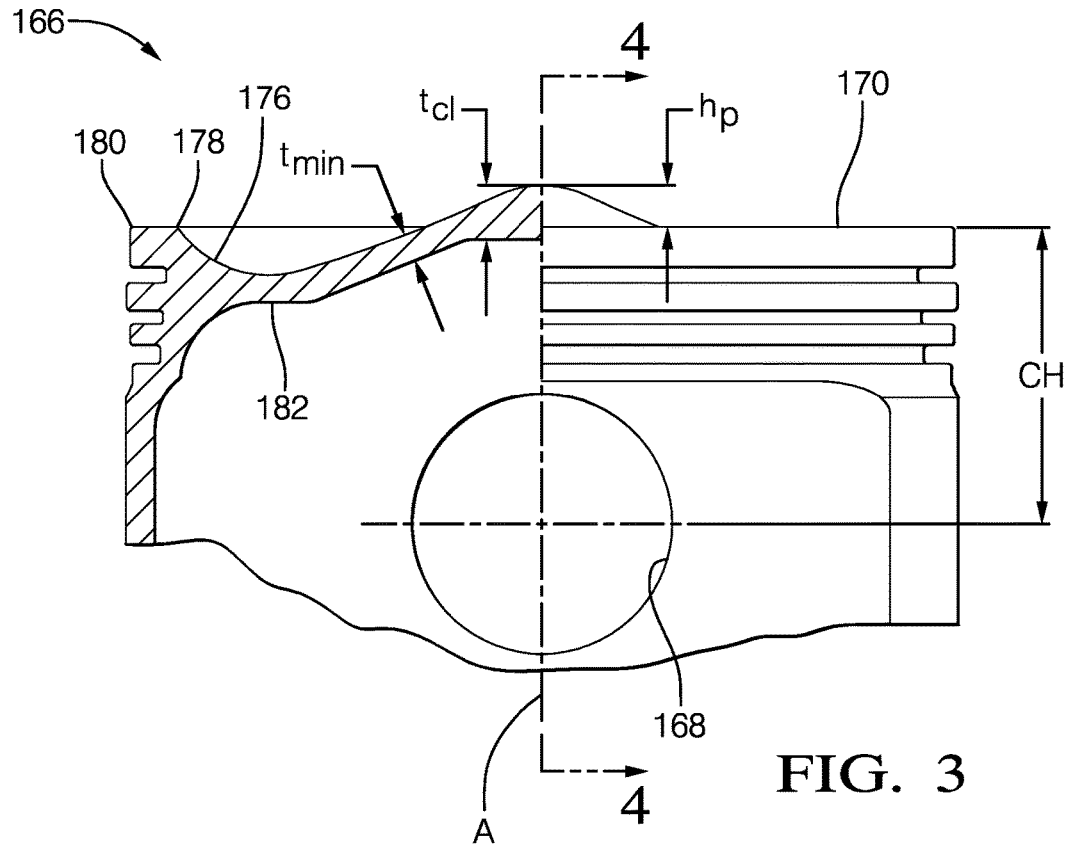
FIG. 3 depicts a first sectional view of an embodiment of a piston incorporating aspects of the present invention.
Figure 4:
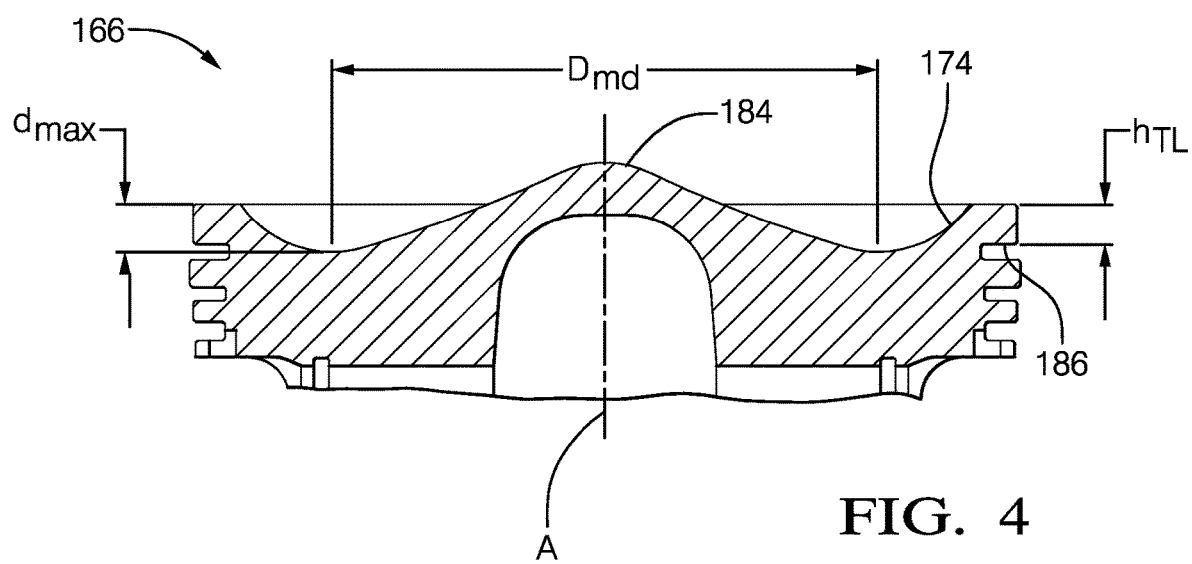
FIG. 4 depicts a second sectional view of an embodiment of a piston incorporating aspects of the present invention.

With the foregoing considerations in mind, a piston design for GDCI combustion process has been developed. FIG. 3 and FIG. 4 depict views of an embodiment of the piston design, with FIG. 3 showing a partial sectional view of a piston 166 looking in the direction of the axis of the piston pin bore 168, and FIG. 4 showing a sectional view of the piston 166 looking in a direction perpendicular to the view of FIG. 3. The piston surface 174 that faces the cylinder head (not shown) defines a bowl 176 extending downward from the piston rim 170, with the bowl being axisymmetric, that is to say having rotational symmetry about a central axis "A". In the embodiment shown in FIGS. 3 and 4 the shape of the bowl 176 is defined by rotating a profile about the central axis "A" such that contour lines taken along planes perpendicular to axis "A" would appear as concentric circles.

Geometric features associated with the GDCI piston embodiment depicted in FIGS. 3 and 4, along with characteristics of a diesel piston used in GDCI development, are presented in tabular form in Table 1 below:

TABLE 1

| Category | Feature (designation in Figures) | Units | GDCI | Diesel | % Reduction |
|---|---|---|---|---|---|
| Material | | | Steel | Aluminum | |
| Surface Area | Piston surface area | $cm^2$ | 60.67 | 80.53 | 24.7 |
| | | % of bore area | 109.5 | 145.3 | |
| | Squish area | % of bore area | 8 | 67 | 88.1 |
| Crown | Minimum crown wall thickness ($t_{min}$) | mm | 3 | 10 | 70.0 |
| | | % of cyl bore | 3.6 | 11.9 | 70.0 |
| | Crown wall thickness at centerline ($t_{CL}$) | mm | 5.1 | | |
| | Ratio $t_{CL}/t_{min}$ | | 1.7 | | |
| Bowl Shape | Diameter of maximum bowl depth $D_{md}$ | mm | 56.7 | | |
| | | % of cyl bore | 67.5 | | |
| | PIP Height ($h_p$) | mm above rim | 4 | | |
| | | mm below roof of combustion chamber | 1.6 | | |
| Topland | Topland height ($h_{TL}$) | mm | 3.07 | 9.2 | 66.6 |
| | Topland radial clearance | mm | 0.36 | 0.475 | 24.2 |
| | Topland radial clearance | % of cyl bore | 0.43 | 0.57 | 24.2 |
| | Topland volume | $mm^3$ | 291 | 1150 | 74.7 |
| Blowby | Ring end gap | mm | 0.2-0.25 | 0.25-0.33 | 20 |
| | 2nd Land Clearance | mm | 0.095 | 0.44 | 78.4 |
| | Blowby area | $mm^2$ | 0.019 | 0.11 | 82.7 |

It will be appreciated that several dimensions associated with a piston lend themselves to scaling as a function of cylinder bore diameter, in the present case 84 mm. Where appropriate, Table 1 includes piston characteristics as dimensionless ratios or percentages, with the value of a characteristic divided by cylinder bore diameter or cylinder bore area as appropriate. As used herein, the term "cylinder bore diameter" refers to the diameter of the bore in which the piston moves. In the case of an engine that utilizes cylinder liners, the cylinder bore diameter would be the inner diameter of the cylinder liner. The cylinder bore area is defined as $\pi D^2/4$, where D is the cylinder bore diameter as described.

With reference to Table 1 and FIGS. 3 and 4, in an exemplary embodiment the piston crown surface 174 has a surface area that is 1.095 times the cylinder bore area (the area of a flat circle having the same diameter). As explained above, minimizing piston surface area is desirable to minimize heat transfer from the combustion chamber.

In the exemplary embodiment, the surface 174 of the piston 166 has a small squish area. As used herein, squish describes an effect which creates sudden turbulence in the combustion chamber as the piston approaches top-dead-center and the piston crown comes close to the cylinder head. As the gap between the squish area of the piston and the cylinder head decreases, gases in the gap are "squished" into the combustion chamber, creating turbulence that promotes mixing of air and fuel in the chamber. While such mixing may be beneficial in engines that use conventional combustion modes, it is undesirable in a GDCI engine because it would interfere with the desired stratification described above. A quiescent chamber is preferred. The GDCI piston design allows the desired range of Phi to be maintained by allowing the injected fuel to remain in a stratified "cloud" rather than a homogenous mixture.

With reference to FIGS. 3 and 4, the squish area is the area of the annular flat portion between the outer edge 178 of the bowl 176 and the outer edge 180 of the piston 166. In the exemplary embodiment, the surface 174 of the piston 166 has a squish area that is 8 percent of the cylinder bore area. Keeping the squish area small promotes maintaining the desired stratification of the air/fuel charge leading up to the start of combustion.

In the non-limiting exemplary embodiment described in Table 1 and FIGS. 3 and 4, the piston crown has a minimum wall thickness designated as $t_{min}$ and a wall thickness at the center line, that is at axis of symmetry "A", designated as $t_{CL}$. It has been determined that it is desirable to keep $t_{min}$ small to keep the thermal mass of the piston 166 low. By maintaining a low thermal mass of the piston 166, control of the temperature of the top surface 174 of the piston 166 can be achieved using one or more controllable oil cooling jets impinging on the bottom surface 182 of the piston 166. Additionally, it has been determined that with substantially uniform wall thickness across the crown, a hot spot may occur at the center of the piston crown, with the hot spot potentially promoting premature combustion of the air/fuel charge. To overcome this problem, it has been determined to be advantageous to have $t_{CL}$, the wall thickness at the center line "A", higher than the minimum wall thickness $t_{min}$. In the exemplary embodiment presented in Table 1 and FIGS. 3 and 4, the ratio $t_{CL}/t_{min}$ has a value of 1.7.

With continued reference FIGS. 3 and 4, the bowl has a maximum depth $d_{max}$ below the rim 170. The diameter corresponding to the maximum depth $d_{max}$ is denoted as $D_{md}$. FIGS. 3 and 4 also show a projection 184, also herein referred to as a "pip", rising from the center of the bowl 176 to a height $h_p$ above the rim 170. In the exemplary embodiment, $D_{md}$, the diameter corresponding to the maximum bowl depth, is 67.5% of the bore diameter, and the pip height $h_p$ is 4 mm above the rim 170. It will be appreciated that the bowl 176 defined in the piston 166 is configured to cooperate with a fuel injector having a given spray angle, defined as the included angle from plume center to plume center for a multi-hole injector. Modifications may be made to characteristics associated with the bowl shape, such as the maximum bowl depth $d_{max}$, the diameter $D_{md}$ corresponding to the maximum bowl depth, and the pip height $h_p$, to accommodate different injector spray patterns, injection pressures, injection timing, and the like.

Another piston characteristic that has been found to be significant is the topland volume. As used herein, the term topland refers to the annular region between the outer diameter of the piston and the wall of the cylinder, vertically from the top surface 186 of the top piston ring to the rim 170 of the piston 166. The topland volume depends on the topland height $h_{TL}$ as well as on the circumference of the piston 166 and on the radial clearance between the piston 166 and the cylinder wall in the topland region. Because GDCI is a lower temperature combustion process than diesel, thermal expansion of the piston is less, and as a result radial clearances can be made tighter between the piston 166 and the cylinder wall. It has been determined that it is difficult to achieve combustion of any fuel that may be present in the topland volume, and the fuel injection strategies for GDCI attempt to avoid injecting fuel into the topland volume. Additionally, air trapped in the topland is cooled and releases late in the combustion process. Not only is the air in the topland wasted (representing a pumping loss), but it cools the surrounding air/fuel mixture making complete combustion of the fuel difficult. As shown in Table 1, for the exemplary embodiment the topland height $h_{TL}$ is limited to about 3 mm so as to advantageously minimize the topland volume.

Because GDCI is a low temperature combustion process, thermal expansion of the piston is reduced. Additionally, the exemplary piston described in Table 1, being made of steel, has a lower thermal expansion than an aluminum piston. These factors allow reduced radial clearances between the cylinder bore and the piston and piston rings, as well as reduced ring end gap. As mentioned above, low blowby is desirable to enable high compression pressure to promote autoignition during engine starting. The blowby area, defined as the product of the ring end gap and the second land clearance, is 0.019 $mm^2$ for the exemplary piston described in Table 1.

While this invention has been described in terms of the preferred embodiments thereof, it is not intended to be so limited, but rather only to the extent set forth in the claims that follow.

The invention claimed is:

1. A piston for use in a GDCI engine, the piston cooperating with the wall of a cylinder defined in the engine and with a cylinder head to define a combustion chamber, the surface of the piston that faces the cylinder head defining a bowl configured to receive fuel dispensed from a fuel injector located in the cylinder head substantially along the central axis (A) of the cylinder, wherein the bowl is configured such that substantially all of the injected fuel associated with a combustion event reaches a localized equivalence ratio greater than 0.0 and less than or equal to 1.2 at a time immediately preceding initiation of the combustion event;

wherein the bowl is configured such that stratification of the localized equivalence ratio is achieved at a time immediately preceding initiation of the combustion event with a first portion of the injected fuel at a localized equivalence ratio of less than 0.3, a second portion of the injected fuel at a localized equivalence ratio greater than 0.3 and less than 0.7, and a third portion of the injected fuel at a localized equivalence ratio of greater than 0.7.

2. The piston according to claim 1, wherein the bowl is configured such that the injected fuel is completely vaporized before impinging on the surface of the piston.

3. The piston according to claim 1 having a squish area that is less than or equal to 8% of the cylinder bore area.

4. The piston according to claim 1 wherein the ratio of the surface area of the surface of the piston that faces the cylinder head to the area of the cylinder bore is greater than or equal to 1.05 and less than or equal to 1.25.

5. The piston according to claim 1 wherein no cooling passages are defined therethrough.

6. The piston according to claim 1, wherein the wall thickness ($t_{CL}$) of the piston crown at the center of the piston crown is greater than the minimum wall thickness ($t_{min}$) of the piston crown, wherein the minimum wall thickness ($t_{min}$) of the piston crown occurs at a location away from the center of the piston crown.

7. The piston according to claim 6, wherein the wall thickness ($t_{CL}$) of the piston crown at the center of the piston crown is at least 1.5 times the minimum wall thickness ($t_{min}$) of the piston crown.

8. The piston according to claim 1, wherein the bowl is axisymmetric about the central axis (A) of the cylinder.

9. The piston according to claim 1, wherein a centrally located projection extends from the floor of the bowl in a direction toward the cylinder head.

10. The piston according to claim 1, wherein the piston is equipped with piston rings configured such that the blowby area is less than 0.05 mm$^2$.

* * * * *